March 5, 1957   E. PANDOLFI   2,784,269
STEERING POST OPERATED SWITCH FOR AUTOMOBILE TURN SIGNALS
Filed April 28, 1955

INVENTOR.
ERNEST PANDOLFI
BY
L. S. Saulsbury
ATTORNEY

United States Patent Office 2,784,269
Patented Mar. 5, 1957

2,784,269
STEERING POST OPERATED SWITCH FOR AUTOMOBILE TURN SIGNALS

Ernest Pandolfi, Valley Stream, N. Y.

Application April 28, 1955, Serial No. 504,591

1 Claim. (Cl. 200—61.31)

This invention relates to an automatic and adjustable directional light system for motor vehicles.

It is the principal object of the present invention to provide a directional light device with mountings for operating contacts adapted to be engaged by a projection on the steering shaft as the steering wheel of the vehicle is turned from right to left whereby the angular turn for engagement of the stem of the shaft to deliver current to the directional light may be altered and adjusted to the particular wheel steering arrangement of a vehicle.

It is another object of the invention to provide a simplified automatic directional light system for vehicles and one which can be readily installed upon the steering post of the vehicle as a unit and which is self-contained except for the wiring and the stem on the steering wheel shaft.

It is still another object of the invention to provide in a directional lighting system having contacts of the trip finger type whereby the steering wheel when the turn is finally effected will permit the release of the contacts so that the light will be automatically turned off for large amounts of turning of the steering wheel and wherein the contacts are held at their intermediate positions and ready for engagement by the stem on the steering shaft by balance springs operating on the opposite sides of each contact to bring the contact to its neutral and inoperative position.

Other objects of the invention are to provide a fully automatic and adjustable directional light system having the above objects in mind which is of simple construction, inexpensive to manufacture, has a minimum number of parts, easy to install upon the steering post, easy to adjust and be adapted to the particular vehicle on which the same is being installed, self-contained, compact, durable, efficient and effective in use.

For other objects and a better understanding of the invention, reference may be had to the following detailed description taken in connection with the accompanying drawing, in which.

Figure 1:
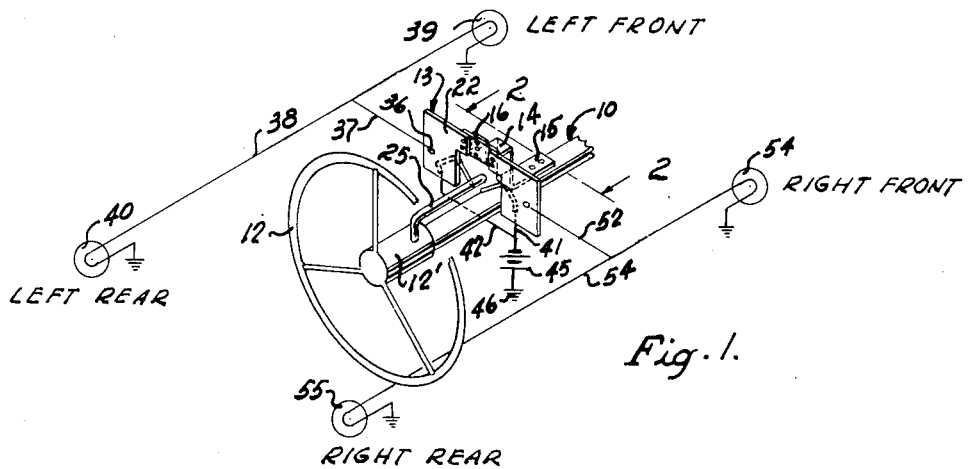
Figure 1 is a perspective view of the directional light device of the present invention mounted upon a steering post and to which a diagrammatic wiring for the light system is connected.
Figure 2:
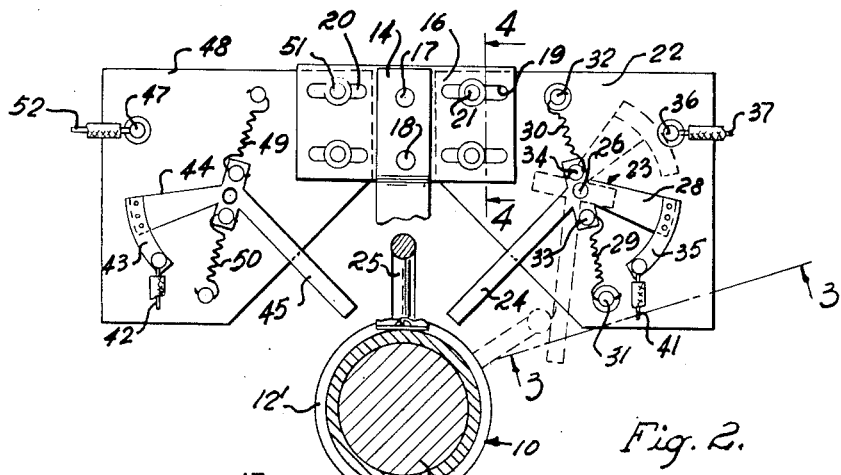
Fig. 2 is an enlarged rear elevational view of the rear of the adjustable contact mounting with the steering shaft in section and the stem thereon centered between the contacts, the view being taken generally on line 2—2 of Fig. 1.
Figure 4:
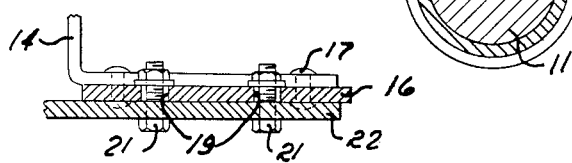
Fig. 4 is a vertical sectional view of the mounting plates as viewed on line 4—4 of Fig. 2.
Figure 3:
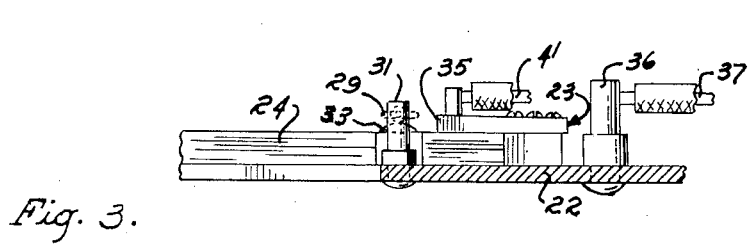
Fig. 3 is an enlarged sectional view taken generally on line 3—3 of Fig. 2.

Referring now to the figures, 10 represents a steering post assembly having a steering shaft 11 to which a steering wheel 12 is attached by its hub 12'. Mounted upon the steering post assembly is the adjustable directional light contact device of the present invention as indicated generally at 13. This light contact device consists of a central bracket 14 fixed by means of fastening screws 15 to the steering post assembly 10. This bracket has a laterally-extending plate 16 fixed to the upper end thereof by means of rivets 17 and 18. This plate has pairs of vertically-spaced parallel elongated slots 19 and 20 on the respective opposite sides thereof.

At one side of the plate 16 and secured by fastening bolts 21 extending through the elongated slots 19 is an adjustable contact supporting plate 22 on which a pivotal contact assembly 23 is mounted.

This contact assembly has an operating arm 24 that extends at an angle of approximately 45° with reference to a depending stem 25 on the steering wheel hub 12' and adapted to engage the contact arm 24 when the steering wheel is turned to the right to effect a right turn of the vehicle.

The contact assembly 23 is pivoted upon a pin 26 and has balance springs 29 and 30 respectively anchored to posts 31 and 32 on the plate 22, which is of insulating material and connected at their other ends to projections 28 on the contact assembly by respective pins 33 and 34. The contact assembly 23 has an arcuate shaped contact plate 35 adapted to engage a stationary contact 36 and adapted to ride over the same for an angle of substantially 45° as the steering wheel is continued to be turned and so long as the stem 25 engages the operating arm 24. The stem 25 follows through with the operating arm but may disengage the same upon further turning of the steering wheel. Upon return movement of the stem, the same may engage the opposite edge of the operating arm and will rotate the contact in the opposite direction without engagement with the stationary contact 36 to light the signal lamps.

The terminal 36 is connected through wires 37 and 38 to signal lights 39 and 40 on the left side of the vehicle and at the front and rear thereof. These lamps have ground connections with the vehicle. On the arcuate contact member 35 is a wire 41 which is connected with a wire 42 from an arcuate contact 43 of a right contact assembly 44 to a battery 45 that is grounded to the vehicle as indicated at 46. The contact 43 of the right contact assembly 44 will have its operating arm 45 engaged by the stem 25 on the steering post assembly as the steering wheel is turned to the right to make contact with a stationary contact 47 on adjustable supporting plate 48. This contact assembly has balance springs 49 and 50 for returning the contact and its operating arm to a neutral position with the operating arm substantially 45° from the stem 25 of the steering shaft 11.

The supporting plate 48 is joined to the opposite end of the laterally-extending plate 16 by fastening bolts 51 extended through the plate and the elongated slots 20. When the arcuate contact plate 43 engages the stationary contact 47, current will flow through wires 52 and 53 to front and rear directional lights 54 and 55 at the front and rear ends of the vehicle and grounded thereto.

If it is desired to change the point of engagement of the stem 25 with either of the contact operating arms 24 and 45, the bolts 21 or 51 can be loosened and the supporting plate 25 or 48 adjusted laterally on the laterally extending plate 16 as permitted by the elongated slots 19 or 20. The time of engagement of the arcuate contacts with the fixed contacts will be held through a movement of substantially 45 degrees of turning of the contact assembly upon its supporting plate. The adjustment of the plates 22 or 24 in or out will increase or decrease the amount of movement required of the steering wheel and of the stem 25 to engage the contact arm 24 or 45.

It should now be apparent that there has been provided a directional light system which is fully automatic and which is adjustable to adapt the contact assembly to a particular steering wheel arrangement. It will further be seen that the contact is engaged after approximately 45 degrees of turning movement of the steering wheel and the contact will be held for the turning movement of another 45 degrees and that thereafter the operating arm or finger of the contact assembly may be released so that the lights are extinguished as the turn of the vehicle has been completed. Reverse turning movement of the steering wheel or stem back to the straight running of the vehicle will not again turn on the light as the contact assembly is operated to move its contact plate away from the fixed contact.

It should be further apparent that the directional lights will be turned on as the vehicle is being turned to the side of the road to give indication automatically that the vehicle is leaving the road to park at the side thereof and that the lights will stay on as long as there is a turn of the steering wheel to the amount of 45 to 90 degrees.

While various changes may be made in the detail construction of the assemblies and the manner in which the contact assemblies are adjusted, it shall be understood that such changes shall lie within the spirit and scope of the present invention as defined by the appended claims.

What is claimed is:

An automatic and adjustable directional light for motor vehicles comprising a steering post, a bracket fixed to the steering post, contact assembly plates adjustably connected to the opposite sides of the bracket for adjustable movement with respect thereto, contact assemblies on the respective plates having operating arms extending radially inwardly toward the steering post and a steering shaft having a stem normally disposed between the contact arms and engageable with either one of the other of said arms to operate the contact assemblies as the steering shaft is turned, said bracket including a laterally-extending plate having on the respective ends thereof a pair of vertically-spaced, parallel elongated slots and said supporting plates having fastening bolts extending through the elongated slots and adapted to be secured thereto in any of the adjusted positions of the plates upon the laterally extending plate of the bracket.

References Cited in the file of this patent
UNITED STATES PATENTS

| | | |
|---|---|---|
| 1,707,139 | Raab | Mar. 26, 1929 |
| 2,168,684 | Reenstierna | Aug. 8, 1939 |
| 2,560,539 | Bailey | July 17, 1951 |